United States Patent
Dyne et al.

(10) Patent No.: US 10,725,455 B2
(45) Date of Patent: Jul. 28, 2020

(54) ADAPTIVE GATELINE CONFIGURATION

(71) Applicant: Cubic Corporation, San Diego, CA (US)

(72) Inventors: Mark Dyne, Croydon (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/562,115

(22) Filed: Sep. 5, 2019

(65) Prior Publication Data
US 2020/0081418 A1     Mar. 12, 2020

Related U.S. Application Data

(60) Provisional application No. 62/729,783, filed on Sep. 11, 2018.

(51) Int. Cl.
    *G05B 19/4155*     (2006.01)
    *G06F 16/2455*     (2019.01)
    *G07B 15/04*     (2006.01)

(52) U.S. Cl.
CPC ..... *G05B 19/4155* (2013.01); *G06F 16/2455* (2019.01); *G05B 2219/31093* (2013.01); *G07B 15/04* (2013.01)

(58) Field of Classification Search
CPC ...... G05B 19/4155; G05B 2219/31093; G06F 16/2455; G07B 15/04

(Continued)

(56) References Cited

U.S. PATENT DOCUMENTS 5,176,082 A * 1/1993 Chun ............ B61B 1/02
                                      104/28
6,741,175 B1 * 5/2004 Rauch ............. B61B 1/02
                                      340/541

(Continued)

FOREIGN PATENT DOCUMENTS

JP     H04248694 A     9/1992
JP     2016035665 A * 3/2016 ............ G07B 15/00

(Continued)

OTHER PUBLICATIONS

Martella, C., et. al.: "On current crowd management practices and the need for increased situation awareness, prediction and intervention", Safety Science, Elsevier, Amsterdam, NL, vol. 91, Sep. 19, 2016 (Sep. 19, 2016), pp. 381-393, XP029764477, ISSN: 0925-7535, DOI: 10.1016/J.SSCI.2016.09.006, abstract.

*Primary Examiner* — Kenneth M Lo
*Assistant Examiner* — Mohammed Shafayet
(74) *Attorney, Agent, or Firm* — Kilpatrick Townsend & Stockton LLP

(57) ABSTRACT

A method of operating a gateline includes obtaining, at a computing device, information indicative of one or both of a current or predicted amount of throughput of transit users through the gateline and calculating, based at least in part of the information, a desired configuration of one or more fare gates in the gateline. The desired configuration is compared to a current gateline configuration. A command is sent to the gateline to adjust the current gateline configuration to match the desired configuration based on a determination that the desired configuration is different than the current gateline configuration.

20 Claims, 6 Drawing Sheets

(58) Field of Classification Search
USPC .......................................................... 700/275
See application file for complete search history.

(56) References Cited

U.S. PATENT DOCUMENTS

| | | | | |
|---|---|---|---|---|
| 7,801,629 B2* | 9/2010 | Hale | ...................... | G06Q 10/02 340/4.6 |
| 2002/0145505 A1* | 10/2002 | Sata | ...................... | G07B 15/00 340/5.2 |
| 2005/0092831 A1* | 5/2005 | Sandoval | ............... | G07B 15/04 235/382 |
| 2006/0058704 A1* | 3/2006 | Graichen | .............. | A61B 5/1113 600/595 |
| 2006/0067456 A1* | 3/2006 | Ku | ........................... | G07C 9/00 377/6 |
| 2008/0195257 A1* | 8/2008 | Rauch | ....................... | B61B 1/02 701/1 |
| 2010/0013931 A1* | 1/2010 | Golan | ................ | G06K 9/00771 348/150 |
| 2011/0153545 A1* | 6/2011 | Greene | ................. | A61B 5/1113 706/54 |
| 2012/0075053 A1* | 3/2012 | Rayner | ................... | G05B 15/02 340/3.1 |
| 2013/0068890 A1* | 3/2013 | Boren | .................... | B64D 11/00 244/137.2 |
| 2014/0163860 A1* | 6/2014 | Chiantera | .............. | G06Q 10/02 701/400 |
| 2014/0343850 A1* | 11/2014 | Faaborg | ................. | G01C 21/26 701/537 |
| 2015/0317853 A1* | 11/2015 | Reymann | ........... | G07C 9/00111 340/5.7 |
| 2018/0211188 A1 | 7/2018 | Bergdale et al. | | |
| 2018/0315263 A1* | 11/2018 | Junes | ...................... | G07C 9/00 |

FOREIGN PATENT DOCUMENTS

| | | | | |
|---|---|---|---|---|
| JP | | 2016035665 A | 3/2016 | |
| WO | WO-2014121328 A1 * | | 8/2014 | ........... G06Q 10/083 |

* cited by examiner

ADAPTIVE GATELINE CONFIGURATION

CROSS-REFERENCES TO RELATED APPLICATIONS

This application is a nonprovisional of and claims the benefit of priority to U.S. Provisional Patent Application No. 62/729,783, filed Sep. 11, 2018, entitled "ADAPTIVE GATELINE CONFIGURATION," the entire contents of which are herein incorporated by reference.

BACKGROUND OF THE INVENTION

In traditional transit systems, gatelines can be used to regulate the flow of transit users from one area to another. For example, at a subway station, a gateline may be used to regulate the flow of transit users entering and/or exiting the station. Transit users may need to swipe, tap, or otherwise present transit media for scanning at a fare gate to enter a platform of a station. And in some stations, transit users may need to do something similar when exiting a station (e.g., to enable the transit system to calculate a fare, which may be based on both origin and destination of travel).

The configuration of the gateline can vary, depending on desired functionality. Typically, a gateline is configured to maximize the amount of throughput of transit users. For a given gateline that may have, for example, 10 fare gates, five of the fare gates may be configured to allow passengers to exit, and the remaining five fare gates may be configured to allow passengers to enter, assuming a roughly equal amount of traffic moving in both directions. Fare gates may be configured differently, but changing the configuration of fare gates often requires a transit system employee to adjust the configuration manually (e.g. by inputting a configuration to a station server communicatively coupled with the gateline, which can cause the fare gates of the gateline to adjust their individual configuration accordingly).

Manual configuration adjustment can be problematic for various reasons. When a platform or other area becomes crowded, it can become unsafe. Thus, it may be desirable to limit throughput to the overcrowded area and/or increase throughput out of the overcrowded area. But it can be difficult for an employee to reconfigure the gateline at these times when overcrowding is an issue, because the employee may be involved in other tasks (which may be worsened by the overcrowding).

BRIEF SUMMARY OF THE INVENTION

Embodiments of the present invention are directed to systems and methods for dynamically adjusting a direction of one or more gates in a gateline. Embodiments may take into account current and/or historical data to predict a throughput of passengers through the gateline in an inward direction and/or outward direction. Embodiments may access data from sensors and/or external data sources to inform the gatelines of the predicted outputs and may adjust the number of gatelines being used for inflow and/or outflow accordingly. In some embodiments, adjustments to the gateline may be made based largely or entirely on historical data, while in other instances the adjustments may be more reactive to immediate conditions or expected conditions based on one or more external factors.

In one embodiment, a method of operating a gateline is provided. The method may include obtaining, at a computing device, information indicative of one or both of a current or predicted amount of throughput of transit users through the gateline and calculating, based at least in part of the information, a desired configuration of one or more fare gates in the gateline. The method may also include comparing the desired configuration to a current gateline configuration and sending a command to the gateline to adjust the current gateline configuration to match the desired configuration based on a determination that the desired configuration is different than the current gateline configuration.

In some embodiments, the information may include sensor information indicative of a number of transit users within one or more zones adjacent to the one or more fare gates in the gateline. The sensor information may be further indicative of a velocity of at least one transit user within the one or more zones. In some embodiments, the information may include polling information from the one or more fare gates in the gateline. The gateline polling information may include an average throughput taken over a period of time. In some embodiments, the method may further include obtaining crowd information regarding a number of people in an area to which the gateline allows transit users to exit or enter. Calculating the configuration of the one or more fare gates in the gateline may be further based on the crowd information. In some embodiments, the desired configuration may include one or more of a determination of a direction of the throughput of transit users through the one or more gates in the gateline, a determination of a maximum throughput of transit users through the one or more fare gates in the gateline, or a determination of a minimum throughput of transit users through the one or more fare gates in the gateline.

In another embodiment a method of operating a gateline includes obtaining, at a computing device, information indicative of one or both of a current or predicted amount of throughput of transit users through the gateline and determining a number of inflow gates from the gateline and a number of outflow gates from the gateline that are needed based at least in part on the information. The method may also include determining that a current gateline configuration does not have the number of inflow gates and the number of outflow gates and sending a command to the gateline to adjust the current gateline configuration to have the number of inflow gates and the number of outflow gates.

In some embodiments, the information may include a predicted amount of throughput of transit users, the predicted amount of throughput being based at least in part on historical gateline polling information. In some embodiments, obtaining information may include retrieving from external database. In some embodiments, the method may further include determining that a particular timeframe is typically volatile in terms of transit user throughput. Determining the number of inflow gates from the gateline and a number of outflow gates from the gateline may be based on reactive gateline metrics based on the determination that the particular timeframe is typically volatile in terms of transit user throughput. In some embodiments, the information may be related to one or more of a current passenger level of one or more incoming transit vehicles, an expected arrival time of one or more incoming transit vehicles, weather data, traffic information, transit vehicle schedule information, passenger ticket information, or event information. In some embodiments, the current or predicted amount of throughput may include one or both of inflow or outflow of transit users. In some embodiments, the information comprises a current queue length at the gateline.

In another embodiment, a computing system for operating a gateline is provided. The computing system may include a communications interface, a processor, and a memory. The memory may have instructions stored thereon that, when executed, cause the processor to obtain information indicative of one or both of a current or predicted amount of throughput of transit users through the gateline and calculate, based at least in part of the information, a desired configuration of one or more fare gates in the gateline. The instructions may further cause the processor to compare the desired configuration to a current gateline configuration and send, using the communications interface, a command to the gateline to adjust the current gateline configuration to match the desired configuration based on a determination that the desired configuration is different than the current gateline configuration.

In some embodiments, the computing system includes one or more sensors that are configured to detect a number of transit users within one or more zones adjacent to the one or more fare gates in the gateline. The information may include the number of transit users detected by the one or more sensors. In some embodiments, the one or more sensors may include one or more of a stereoscopic sensor, a depth camera, an infrared sensor, a closed circuit television camera, a beacon in communication with one or more mobile devices of transit users, or a pressure sensitive walkway. In some embodiments, the computing system comprises a transit station server. In some embodiments, the instructions further cause the processor to obtaining crowd information regarding a number of people in an area to which the gateline allows transit users to exit or enter. Calculating the configuration of the one or more fare gates in the gateline may be further based on the crowd information. In some embodiments the information may include a predicted amount of throughput of transit users, the predicted amount of throughput being based at least in part on historical gateline polling information.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the invention(s) described herein are generally related to the use of sensor technology around a row of fare gates (aka a gateline) to dynamically adjust its configuration to control passenger flow. This allows passenger throughput through a gateline to be controlled according to actual crowding data and set overall thresholds. Although embodiments herein are described with respect to a transit system (e.g., subway, light rail, etc.), a person of ordinary skill in the art will understand that alternative embodiments may vary from the embodiments discussed herein, and alternative applications may exist (e.g., stadiums, arenas, airports, etc.).

Embodiments of the inventions described herein are directed toward dynamically adjusting the configuration of a gateline based on sensor and/or other information, allowing passenger throughput through a gateline to be controlled (maximum, minimum, or set level, for example) according to actual crowding data and set overall thresholds. According to some embodiments, individual gate configurations in an overall gateline may be based on sensor input from around the gateline. According to some embodiments, wall-mounted, overhead, and/or other sensors at a gateline may take into account sections where passengers are moving to/queuing to enter the gateline. As numbers build up on the relevant side another gate can change direction to accommodate the crowd and the zones are swapped accordingly. Moreover, embodiments can also measure and immediate effect of gate changes on throughput and adjust the configuration accordingly.

Figure 1:
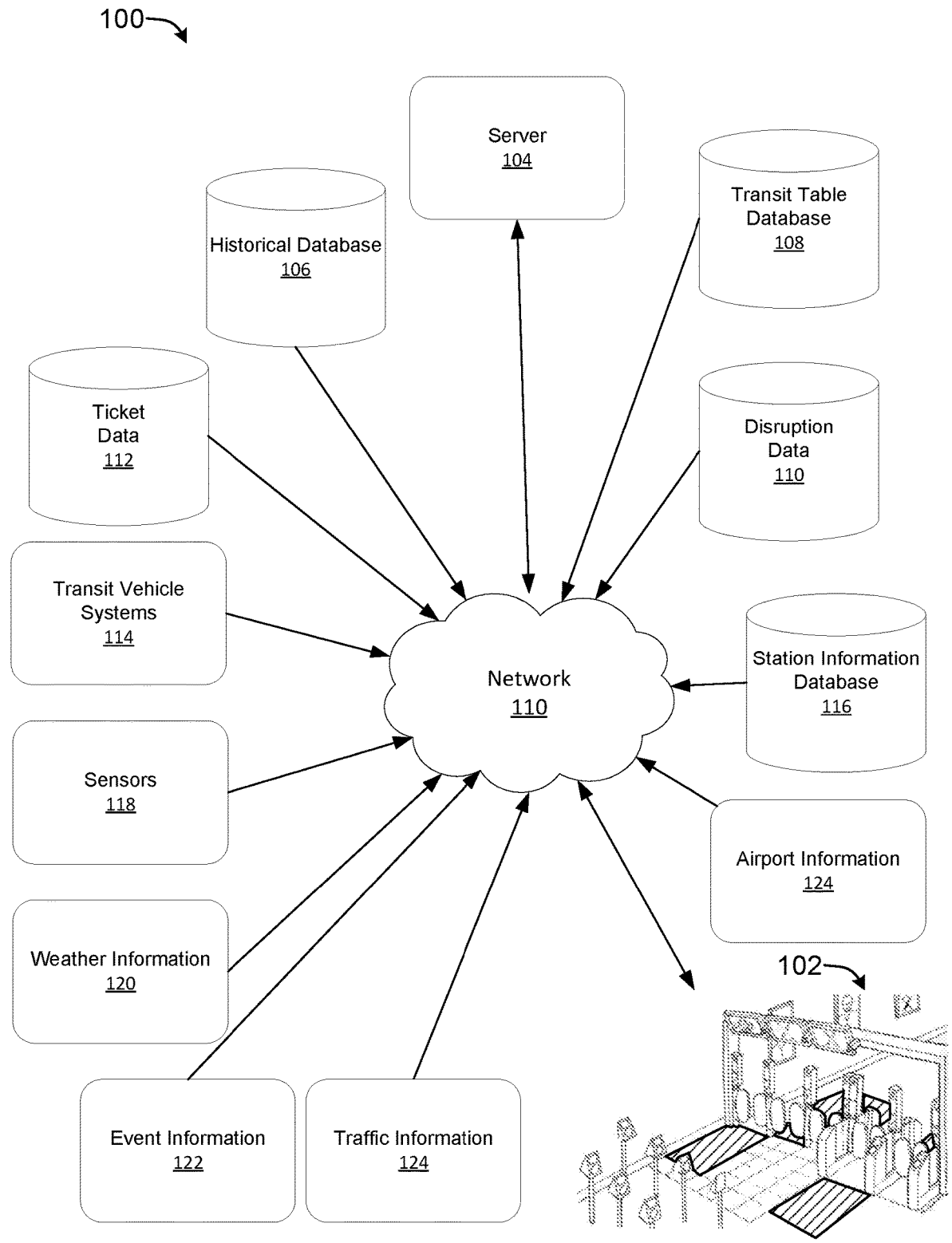
FIG. 1 is a system diagram of a system for operating an adaptive gateline according to embodiments.

FIG. 1 illustrates a system 100 for operating an adaptive gateline 102 according to one embodiment. System 100 may include one or more gatelines 102. Gatelines 102 may be positioned at transit stations (such as for trains, buses, and/or other transit vehicles) and may be configured to allow passengers to enter and/or exit the transit system upon having an access credential validated. Each gateline 102 may include a number of gates that provide entry and/or exit paths for users. Each gate of a gateline 102 may allow users to pass through in a single direction at any given point in time. Some or all of the individual gates may configurable between entry and exit states that allow a single gate to be switched between serving as an entry gate and an exit gate. In some embodiments, the status of each gate of a gateline 102 may be controlled by a server 104.

In some embodiments, server 104 may be a central server of the transit system and may control the operation of some or all of the gatelines 102 in the transit system. In other embodiments, the server 104 may be a station-level server that controls the operation of some or all of the gatelines 102 at a single transit station 102. In other embodiments, server 104 may be a controller that is dedicated to controlling the operation of a single gateline 102. Control over one or more gatelines 102 may involve adjusting a number and/or arrangement of gates that are operating as entry gates and/or exit gates. For example, during busy rush hour mornings, server 104 may be configured to place more gates into an entry mode to allow passengers to more quickly access the transit system, while during rush hour evenings more of the gates may be placed into an exit mode to allow the passengers to more quickly exit the transit system. Server 104 may be configured to make adjustments to the configuration of a particular gateline 102 based on long-term and/or reactive predictions.

To enable the server 104 to automatically make the necessary adjustments to the configurations of one or more gatelines 102, the server 104 may be in communication with a number of data sources. These data sources provide information that the server 104 uses in making determinations on when and how to adjust the configurations of one or more of the gatelines 102. For example, the server 104 may be in communication with a historical database 106. Historical database 106 may be a transit system-operated database that maintains data related to historical passenger throughput information. Oftentimes, historical data may include information from polling at the gatelines 102 themselves, (such as validation attempts, gate and/or other barrier actuations, which may include turnstile increments), ticketing data, and/or other ridership data that may be collected using gatelines 102, transit vehicles, and/or other equipment of the transit system. For example, the historical database 106 may contain metrics and/or other information related to passenger volume and/or direction of flow for particular times of day, days of a week, seasons, specific dates, and/or other time periods. The server 104 may utilize this data to predict what the passenger volume and direction of passenger flow will be at a given time, day, date, etc. based on historical averages and/or other historical data.

In some embodiments, rather than, or in addition to, relying on historical data to determine a necessary configuration of one or more gatelines 102, the server 104 may make a more reactive determination that relies at least in part on data that reflects a current state of one or more factors that influence transit system ridership. In some embodiments, some or all of the data used in making reactive determinations comes from other transit system sources. For example, the server 104 may be connected to a transit table database 108, which may provide the server 104 with information on when particular transit vehicles are due to arrive at a particular transit station. The server 104 may use this information, along with information about which routes and/or tend to be busier (which may be based at least in part on historical data), to predict how much passenger throughput will be experienced in either direction at a particular transit station. In particular, the transit table data may be useful as the largest volumes of passengers entering a transit station typically occur within a short time period prior to the arrival and/or departures of a transit vehicle, while the largest volumes of passengers exiting a transit station often occur just after a transit vehicle arrives.

In some embodiments, the server 104 may access disruption data 110. Disruption data 110 may indicate whether there are any delays, cancellations, detours, additional vehicles and/or other alterations to a usual transit schedule, such as that indicated by the transit table database 108. Such disruptions may be planned and/or unplanned, but may disrupt normal operation of all or a part of the transit system and may impact ridership. For example, in some embodiments, a disruption may delay one or more transit vehicles and/or cause a number of transit vehicles to reach a station within a short period of time, which may cause a backlog of vehicles that may result in a large amount of passengers wanting to exit the transit station within a short period of time. In other embodiments, the disruption may prevent one or more vehicles from reaching a transit station and may result in very few people exiting the transit station for a period of time. In other embodiments, one or more disruptions may be may available to the public, which may result in fewer passengers attempting to utilize the transit system for a period of time, which may cause the number of passengers entering and/or exiting one or more transits stations to be reduced.

In some embodiments, the server 104 may be in communication with one or more ticket data sources 112. Ticket data sources 112 may include one or more ticket databases that may include information related to a number of tickets that have been purchased for a particular time, route, date, for a particular destination, at a particular transit station, and/or other criteria. The databases may include information for one transit station, a subset of the transit stations, and/or for all transit stations within the transit system. In some embodiments, the ticket data sources 112 may include one or more ticketing devices, such as ticket kiosks, that may provide information related to how many tickets have been purchased at the particular ticketing device. Ticketing data may be used by the server 104 as an indication of how many passengers may be using the transit system at a particular time. For example, tickets for a particular time, vehicle, route, and/or date may be indicative of how many users may board and/or exit at a particular transit station at a particular time. One way tickets may be indicative of passengers who are going to enter the transit system in a short period of time, likely at a station at which the ticket was purchased. While not necessarily reflecting actual ridership numbers, the ticketing data may be usable to derive an expected throughput of passengers through the gatelines 102. In some embodiments, historical data may be used to identify trends in the ticketing data. For example, it may be shown that some percentage of passengers, such as 90% of passengers, may enter the nearest transit station within a short period, such as within 15 minutes, of purchasing a ticket. The ticketing data may then be analyzed by the server 104, which may determine how many passengers are likely to enter a particular transit station based on a comparison with the historical data.

In some embodiments, the server 104 may be in communication with one or more transit vehicle systems 114. Transit vehicle systems 114 may be computing devices that are present on transit vehicles themselves and/or may be computing devices that are in communication with a transit vehicle computer. In embodiments in which the transit vehicle systems 114 are present on the transit vehicles themselves, some or all of the transit vehicles may include a transit vehicle system 114, and the server 104 may be in communication with some or all of the transit vehicle systems 114. The transit vehicle system 114 may provide a variety of data to the server 104. For example, information related to the positioning of one or more transit vehicles. This information may include a current location (such as provided by GPS sensors of the vehicle, communications between the vehicle and one or more beacons along a route of the transit system, and/or other location information), a current speed of the transit vehicle, a current heading of the transit vehicle, route information and/or other information related to the position of one or more transit vehicles. In some embodiments, an estimated time of arrival (ETA) of one or more transit vehicles may be provided to the server 104 (in some embodiments the server 104 may calculate the ETA of one or more transit vehicles based on some or all of the information received from the transit vehicle system 114 and/or other data source), which may be used by the server 104 to determine when a transit vehicle may arrive at a particular transit station and drop off a number of passengers that may wish to exit the transit system within a short period of time.

The transit vehicle systems 114 may provide information on the capacity of a particular transit vehicle, which may be based on a number of cars, seats, and/or other criteria of a particular transit vehicle. In some embodiments, rather than or in addition to a capacity of the vehicle, an actual and/or estimated passenger count for one or more transit vehicles may be provided to the server 104 by the transit vehicle systems 114. This passenger count may be particularly helpful in determining how many people may attempt to exit a transit station at an upcoming stop. The transit vehicle system 114 may supply information regarding the last stop for a particular transit vehicle. Typically, all passengers must get out of the transit vehicle at its last stop. Therefore, the number of passengers (either expected or actual) may be quite useful in determining how many people will exit the transit system at the last stop (although some may still connect to other transit lines). A determination of how many passengers will exit may be based further on historical data, ticketing data, and/or other information known to the server 104. In some embodiments, the server 104 may receive information related to transit stations that are especially busy. For example, transit stations near airports, populous downtown area, large commercial and/or industrial areas, and the like may experience especially high volumes of passengers. As a result, the server 104 may flag or otherwise identify the busier transit stations (such as all transit stations experiencing a certain threshold number of passengers for a particular time period and/or a particular number of most used transit stations) such that the server 104 may take into account that a larger number of passengers may enter and/or exit such transit stations at particular times.

A station information database 116 may provide the server 104 with data related to one or more transit stations. For example, the data may include information such as a capacity of one or more platforms in the transit stations, information as to how much passenger traffic a particular transit station experiences at different dates and/or times (such as by a number of total passengers and/or a rate of passengers over a particular period of time), whether the transit station is near and/or on the way to a busy area such as a downtown area or airport, and/or other information that may be specific to a particular transit station.

It will be appreciated that the information above (and other information) may be provided by different data sources. For example, some of the databases may be combined into larger, more generic databases and/or broken up into a number of smaller and/or more specific databases. The database arrangement illustrated in FIG. 1 is merely meant to be illustrative of one particular embodiment and deviations from this arrangement are contemplated.

In some embodiments, to further enhance the ability of the server 104 to make reactive determinations as to how to properly configure gatelines 102, the server 104 may be in communication with one or more sensors 118. Sensors 118 may include one or more different types of devices. For example, optical imaging devices such as cameras, stereoscopic sensors, closed circuit television cameras, infrared sensors, and the like may be positioned overhead in a transit station, such as in an area near a gateline 102. In some embodiments, weight-based sensors, such as (but not limited to) pressure sensitive floor tiles may be positioned in some or all of the transit system on one or both sides of the gatelines 102. For example, in some embodiments, pressure sensitive tiles may be positioned within each zone proximate a gateline 102 (which may be defined as an area, radius, and/or other distance about one or both sides of a gateline 102) such that users walking or standing on the tiles will be detected.

The various sensors 118 may be used to monitor a number of users in a zone near the gateline 102 on the entry side and/or the exit side of the gateline 102. The number of users within the zone may help the server 104 determine a likely number of people who may pass through one or both sides of the gateline 102 within a short period of time (e.g., 5 minutes), as a large proportion (or all) of the people within the zone may wish to enter and/or exit the transit system. The sensors 118 may also be used to detect a velocity and/or path of movement of the passengers within a detection range of the various sensors. This information may be used to determine whether a passenger is headed toward a gateline 102 for entry into or exit from the transit system. For example, based on the path of a passenger, it may be determined that the passenger is headed to a shop or restroom facility within the transit station and is not going to exit the transit system soon. Such passengers may be discounted from the expected throughput at an entry gate of a gateline 102.

The server 104 may also receive information from one or more of the gatelines 102. For example, the server 104 may receive polling data from the gatelines that indicates the number of people traveling each way through the gateline 102. For example, such information may be determined based on successful validations of fare media, turnstile counts, and/or other measures of passenger throughput that can be extracted from the gateline 102. The number of passengers travelling through the gateline 102 in either direction may be averaged over a certain period of time (e.g., one minute, five minutes, 10 minutes, etc.) to determine current and/or historical trends in the throughput of the gateline 102.

In some embodiments, some or all of the data used in making reactive determinations comes from external data sources. For example, the server 104 may be coupled with a weather information source 120 that may provide past, current, and/or future weather information and forecasts. The server 104 may use such information to predict passenger volumes. For example, rainy weather typically causes more people to utilize transit options, as the weather is less suitable for walking, cycling, and the like. Conversely, sunny warm days may see reduced ridership as people may wish to spend more time outdoors.

The server 104 may also be coupled with one or more event information sources 122. Events, such as concerts, sporting events, speeches, and the like may cause increased ridership, especially at times that are near a beginning or end of an event. The event information sources 122 may provide the server 104 with any data that may be relevant for predicting passenger throughput. For example, information related to the location of an event, start and/or end times of an event, a date of an event, an expected capacity of an event, and/or other event information may be passed to the server 104 for use in determining an expected throughput. For example, the server 104 may identify a transit station most proximate a football stadium and determine that for a short period (e.g., 10 minutes, 20 minutes, 30 minutes, 1 hour, etc.) before and/or after the start of the football match there will be a sizable increase in the number of passengers exiting the transit station most proximate to the football stadium and may adjust a gateline 102 to have more gates in an exit direction. Similarly, the transit station most proximate to the football stadium may see significantly increased numbers of passengers entering the transit system to leave the stadium area for other locations and may therefore adjust the gateline 102 to have more gates in an entry direction.

The server 104 may also be in communication with one or more sources of traffic information 124. The sources of traffic information 124 may provide information related to how traffic is flowing and/or whether any congestion, construction, detours, and/or other deviations from normal traffic patterns. Traffic construction and/or congestion may cause more people to utilize the transit system, especially in areas near and/or along routes that are affected by the construction and/or congestion.

The server 104 may also be in communication with one or more other transit systems, such as an airport system 126. The airport system 126 may provide information related to when planes are expected to arrive and/or take off. This may allow the server 104 to identify particularly busy time periods at the airport that may cause an uptick in the amount of traffic at one or more transit stations positioned near the airport.

Any combination of the above information (and/or possibly other sources and/or information) may be used by the server 104 to generate determinations as to what gateline configurations are necessary/desired. Oftentimes, combinations of the types of data may be readily combinable to provide better estimates of passenger throughput at a given time. As one example, current position and/or speed data associated with a particular transit vehicle may be used in conjunction with disruption data to generate a more reliable ETA for the transit vehicle. This ETA may be used, along with passenger numbers from the transit vehicle and/or historical data, to determine a likely number of passengers who will disembark the transit vehicle at a particular transit stop and that may exit the transit stop within a period of time after the transit vehicle has stopped at the transit stop.

Figure 2:
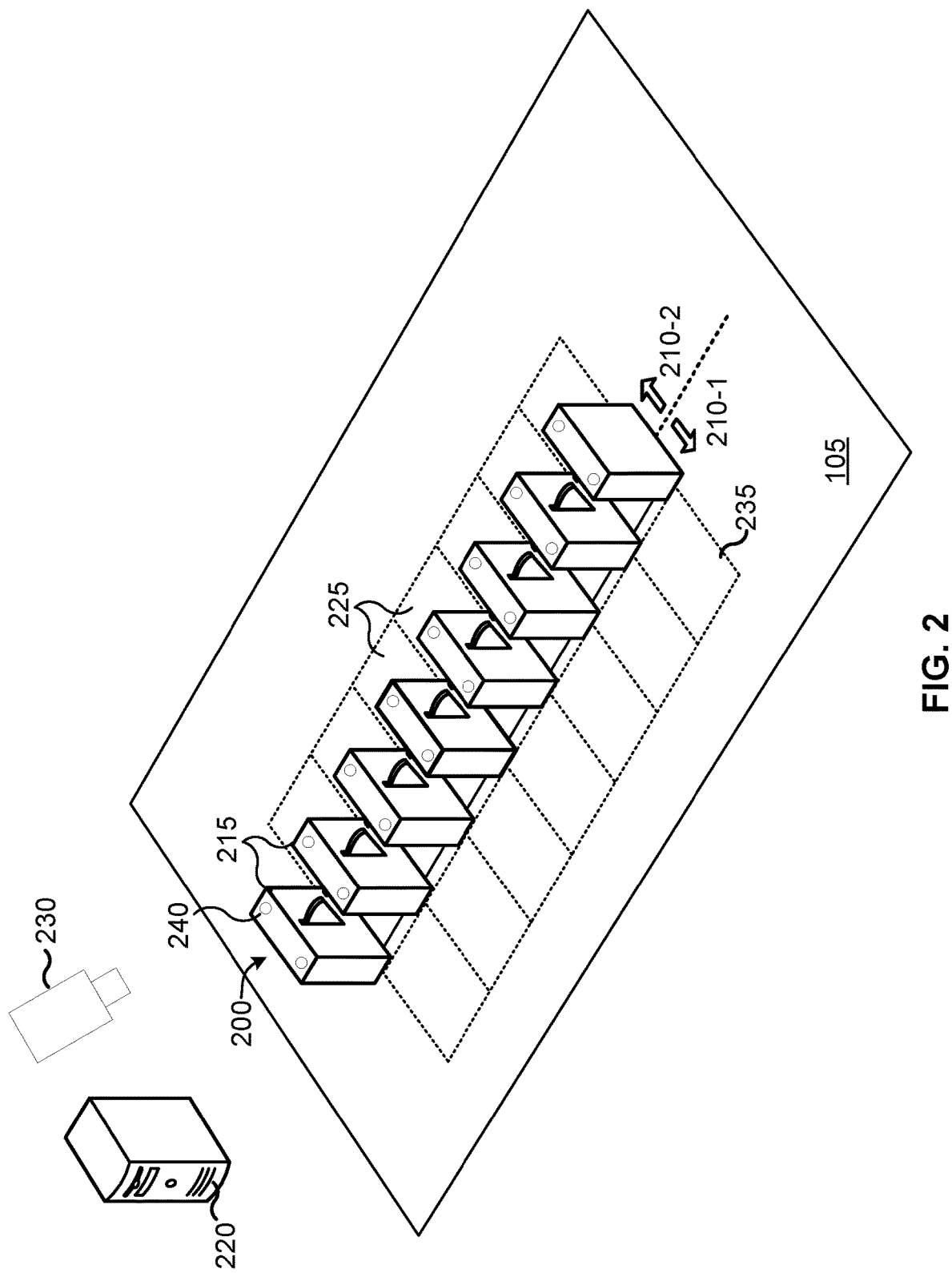
FIG. 2. depicts one embodiment of an adaptive gateline according to embodiments.

FIG. 2 is a simplified diagram of an example gateline 200, according to an embodiment. Gateline 200 may be similar to gateline 102 described above. Here, the gateline 200 is illustrated as being located in an area 205 of the transit system (e.g., near a platform of a train or subway station) restricting access between a first area 210-1 and a second area 210-2 (collectively and generically referred to herein as areas 210). It can be noted that, although not illustrated in FIG. 2, other physical barriers may exist to prevent transit users from moving between areas 210 without moving through the gateline 200.

The gateline 200 comprises a plurality of individual fare gates 215. (To avoid clutter in FIG. 2, only two fare gates 215 are labeled.) Here, the gateline 200 comprises seven fare gates 215, although alternative embodiments can have any number of fare gates 215. Additionally, fare gates 215 may vary in size and function. Various embodiments of fare gates 215 may include physical barriers (such as paddles, turnstiles, standard gates, etc.), lights, speakers, displays, and/or other features. Such features may indicate the configuration of the gateline 200, showing to transit users which fare gates 215 may be used to travel from the first area 210-1 to the second area 210-2, and which fare gates 215 may be used to travel from the second area 110-2 to the first area 210-1. Each fare gate 215 may also include one or more validation units 130 that are usable to read, validate, and/or provide validation results to transit users. For example, validation units 130 may be able to read RF devices, magnetic strip cards, biometric inputs, and/or other types of fare media. (FIG. 4, for example, illustrates how some fare gates may include monitors and other features indicating a direction through which a transit user may travel through each fare gate.)

A computer server 220 (e.g., a station server located in a station at which the gateline 200 is also located) may be communicatively coupled with the gateline 200 and used to configure the gateline 200 according to embodiments herein. Server 220 may be similar to server 104 described above. It can be noted, however, that such functionality may be implemented by any of a variety of computing devices, which may be local to and/or remote from the gateline 200.

To travel through the gateline 200, a transit user may be required to swipe, tap, or otherwise present a fare media (e.g., a magnetic stripe card, a smart card, radio frequency (RF)-enabled device, etc.) at a validation unit 230 (which can include a magnetic stripe reader, radio frequency (RF) reader, or other type of reader capable of scanning information from the fare media) of a fare gate 215. As noted previously, a transit user may be required to do so at both the origin and destination of travel (e.g., entry and exit of the transit system). That said, embodiments herein can apply to applications in which presenting a fare media is required only once (e.g., upon entry to the transit system). If a fare gate 215 includes a physical barrier, the physical barrier may be moved (or made movable to the transit user, such as by unlocking the barrier) once the fare media has been validated and/or access to the area 210 in which the transit user is attempting to travel is otherwise granted.

According to embodiments, one or more sensors may be used to determine data regarding users in zones 225 on either side of respective fare gates 215. (Again, to avoid clutter in FIG. 2, only two zones 225 are labeled.) This data can include a number of users, a speed at which one or more users are traveling through a zone 225, and the like. Sensors can include any of a variety of sensors, such as optical sensors 230 and/or pressure sensitive tiles 235. Oftentimes, the optical sensors 230, such as stereoscopic sensors, cameras, IR sensors, etc., may be positioned above the area 210, such as on a wall and/or above the gateline 200 itself. Pressure sensitive tiles 235 may be positioned on the floor of some or all of the area 210 and allow the presence of transit users standing, sitting, or moving upon the tiles 235 to be detected.

Figure 3:
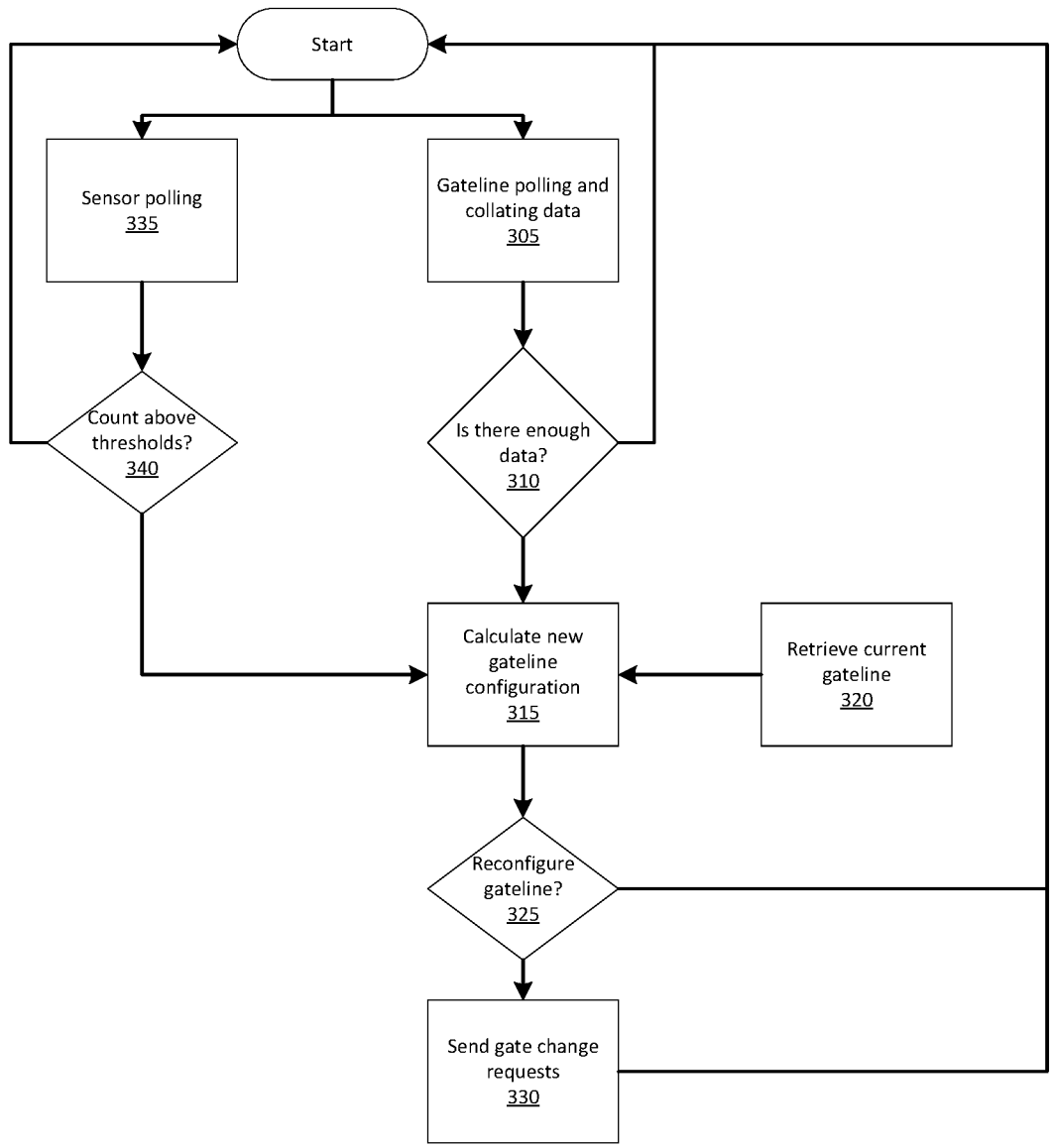
FIG. 3 is a flowchart illustrating a process for operating a gateline according to embodiments.

FIG. 3 is a flow diagram of a method 300 of configuring a gateline 200, according to an embodiment. The various blocks of the method 300 illustrated in FIG. 3 may be executed by hardware and/or software of the computer server 220, fare gates 215, sensor systems (not shown) and/or other devices/systems.

The method 300 may begin by conducting gateline polling and collating data at block 305. The number of people traveling each way through the gateline 200, for example, can be extracted from the gateline 200, and may be averaged over a certain period of time (e.g., one minute, five minutes, 10 minutes, etc.) to determine current and/or historical trends in the throughput of the gateline 200. As indicated in FIG. 3, data may be continued be gathered from the gateline 200 until enough data is collected to calculate a gateline configuration at block 310.

For example, using the gateline polling and collating data, a throughput of the gateline 200 may be determined. A gateline configuration may then be calculated at block 315 and a current gateline configuration may be retrieved at block 320. A gateline configuration may include a number and/or arrangement of gates 215 set up for allowing either entry or exit of transit users. For example, a gateline configuration may specify that a particular number of gates 215 are exit gates and a certain number are entry gates and/or the configuration may specify that a particular number of leftmost gates 215 are exit gates and the certain number of rightmost gates 215 are entry gates. Oftentimes, a gateline configuration will ensure that at least one gate 215 is available for entry and at least one for exit. The calculated gateline configuration may be compared against the current gateline configuration to determine whether the gateline needs to be reconfigured to match the calculated gateline configuration at block 325. If the configuration is different (e.g., if the current configuration includes five entry and five exit fare gates 215, and the calculated gateline configuration includes four entry and six exit fare gates 215), then the gateline may be reconfigured, and a request for the change may be sent (e.g., from the computer server 220 to the fare gates 215 of the gateline 200) at block 330.

In some embodiments, calculating the gateline configuration may be based on an algorithm that balances throughput in both directions. For example, if gateline polling and collating data indicates that throughput in one direction exceeds throughput in the other direction by a certain threshold amount, then a new gateline configuration may be determined. This threshold amount may be based on one or more factors, including the number of fare gates 215 in the gateline 200. This can help ensure that the wait time on either side of the gateline 200 is substantially equal.

As indicated in FIG. 3, calculating a new gateline configuration may be based additionally or alternatively on sensor polling data. Here, again, the method may involve gathering data at block 335 until a threshold amount of data is acquired at block 340 to utilize in a gateline configuration calculation. As indicated previously, sensors may gather data regarding transit users in certain zones 225 in the transit system, which may be located near a corresponding fare gate 215 at block 335. Depending on various factors, such as the sensors utilized, sensor polling may occur as frequently as desired (e.g., every few seconds, every second, multiple times per second, etc.). Different sensors may be polled at different rates.

The utilization of sensor information in this way can enable the gateline 200 to be reconfigured very quickly, if necessary. For example, if sensor information indicates that a zone 225 for a particular fare gate 215 becomes congested with at least a threshold number of people (e.g., four or more), the method illustrated in FIG. 3 may allow for the quick reconfiguration of the gateline 200 so that, for example, an adjacent fare gate 215 (or other fare gate in the gateline 200) is opened up to relieve this congestion. Once the congestion is relieved, the method illustrated in FIG. 3 may cause the original gateline configuration to be restored, depending on sensor polling and/or gateline polling and collating data.

The types of sensors utilized in the sensor polling can vary, depending on desired functionality. As previously noted, sensors may comprise optical sensors 230, such as cameras (overhead and/or located elsewhere), weight-sensitive sensors 235 (e.g., located in/on the flooring of the zone 225), infrared sensors, RF sensors, and the like. Such sensors can be utilized to determine a number of people in the zones 225, a velocity of a person in the zone 225, and/or similar information related to transit user traffic through the gateline 200.

In some embodiments, sensors may additionally or alternatively provide information outside of zones 225. For example, RF sensors may detect RF signals (e.g., Wi-Fi, Bluetooth, etc.) from a large amount of mobile devices, which may be indicative of the arrival of a transit vehicle (e.g., a train, bus, etc.). This information outside of the zones 225 may be utilized along with the sensor polling and/or gateline polling and collating data, as shown in the method illustrated in FIG. 2.

The location and size of the zones 225 for which sensor data is collected can vary, depending on desired functionality. In some embodiments (e.g., in larger stations) zones 225 adjacent to fare gates 215 may be relatively large so that velocity information regarding transit users can be collected, to determine, for example, when transit users will reach a fare gate 215. Additionally or alternatively, zones 225 may be located further away from the gateline 200 (e.g., at entryways, exits, etc.) but may provide data that may apply to transit user traffic through the gateline 200. In some embodiments, a single zone 225 may be utilized on either side of the entire gateline 200, rather than having separate zones 225 for each fare gate 215 of the gateline 200.

Different applicable rules and/or weights may apply to different types of data, depending on desired functionality. For example, gateline polling and collating data may indicate that, historically, traffic flow at a given gateline 200 increases in one direction at a certain time of day. However, sensor data may indicate that on a particular day, traffic flow in the opposite direction is greater during the certain time of day. Thus, the sensor data, which may be indicative of a current need, may be weighted more heavily than gateline polling and collating data, which may be indicative of a historical need. Baseline rules, such as always keeping a minimum number of fare gates 215 open (and/or a certain type of fare gate 215) in a given direction, may also be taken into account. As such, such rules and/or weights may be accounted for when calculating a new gateline configuration.

In some embodiments, other data (i.e., indirect data) may be considered in addition or as an alternative to gateline polling and collating data (i.e., direct data). Such data can include any data that may be applicable to the flow of transit users through the gateline 200, such as the data described in relation to FIG. 1 above. This can include, for example, environmental data (e.g., weather information), traffic data (e.g., existing traffic conditions, roadwork data, etc.), transit system operating data (e.g., arrival and departure times for buses, trains, etc.; data regarding a detected/predicted/historical amount of people on the buses, trains, etc.; data regarding a detected/predicted/historical amount of transit users at a nearby location within the transit system; operating delays; ticket sales data; and the like), etc.

In some embodiments, the effectiveness of gateline configurations can be analyzed, and the analysis may be utilized in subsequent gateline configurations. If, for example, a gateline configuration does not have a sufficient effect on gateline throughput, a subsequent calculation of a gateline configuration may take this into account, which may result in a larger change in the gateline configuration to achieve the desired change in gateline throughput. In some embodiments, machine learning and/or similar features may be used to effectuate such functionality.

Again, the functionality of blocks illustrated in FIG. 3 may be performed by one or more devices in a transit system. In some embodiments, the computer server 220 may perform the functionality of some or all of the blocks. In some embodiments, sending a gate change requests may involve sending a request from one software application executed by the computer server 220 to another software application, which may be executed by the computer server 220, by a fare gate 215 at the gateline 200, and/or by some other device communicatively coupled with the gateline 200.

Figure 4:
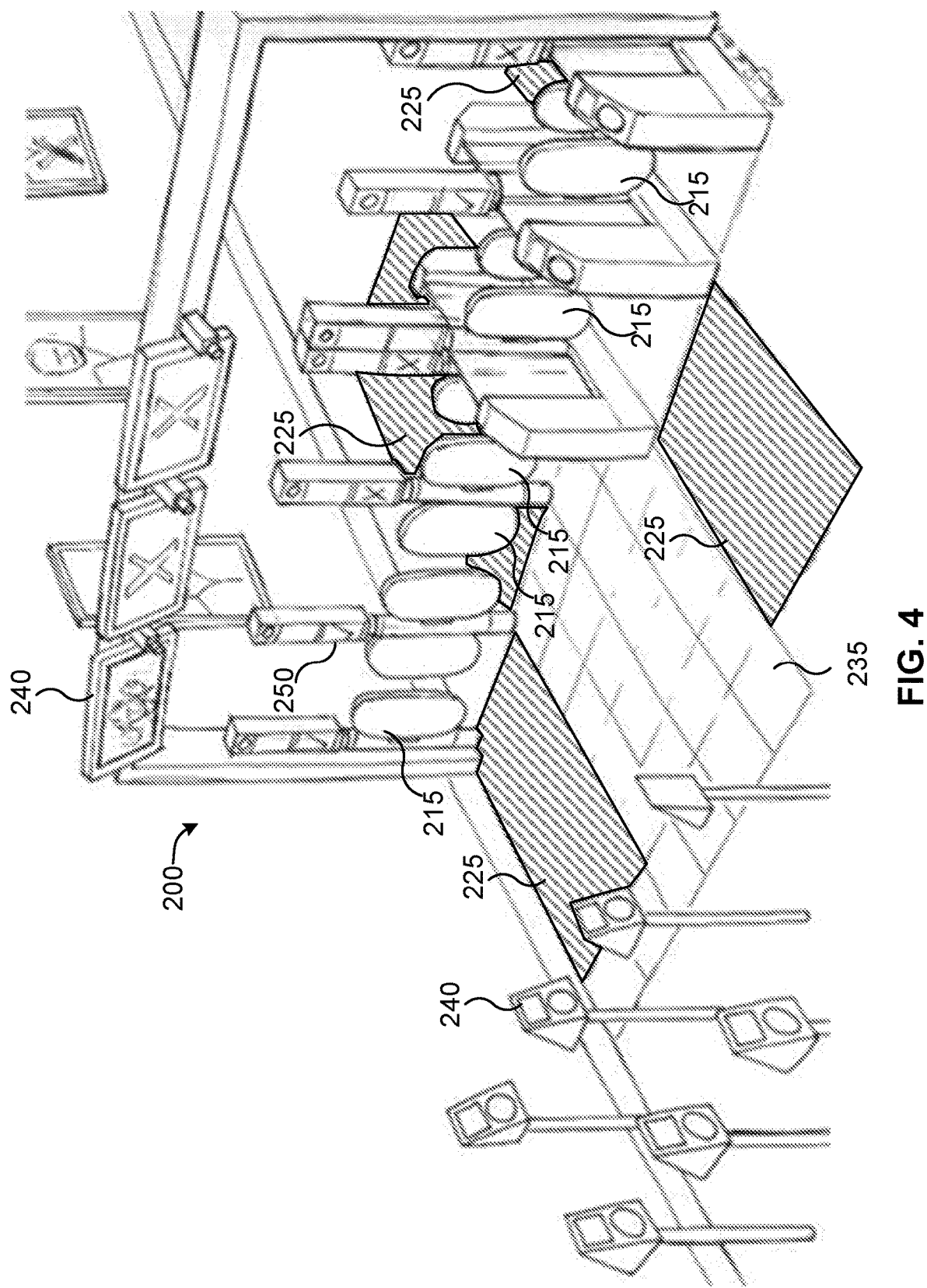
FIG. 4. depicts one embodiment of an adaptive gateline according to embodiments.

FIG. 4 is an illustration of another gateline 200, according to an embodiment. Here, the gateline 200 includes different types of fare gates 215 having barriers. As illustrated, gateline 200 may include monitors 250 and/or lights 245 that provide users an indication of which gates 215 are currently configured to operate as entry gates and exit gates. For example, text and/or images, such as red "X" may indicate that a gate 215 is closed in a particular direction (i.e., is out of service or is being used for the other direction of flow) while a green checkmark, arrow, text stating "GO", and/or other indication may be displayed that indicates that the gate 215 is open for movement in the particular direction. Gateline 200 also include a number of sensors for detecting passenger volume, speed, and/or direction of travel. For example, overhead sensors 230 are mounted atop the gateline 200 and may monitor congestion and/or queue length at one or more of the gates 215. Similarly, pressure sensitive tiles 235 are provided in the floor that detect the presence of users that are positioned atop of the tiles 235. Gateline 200 also includes a number of validation units 240, which may be positioned at and/or near a gate 215. Validation units 240 may be positioned on one or both sides of the gateline 200. As illustrated, in some embodiments, zones 225 may be dynamically configured to reflect the configuration of the gateline 200. That is, in some embodiments, rather than having zones 225 on both sides of a fare gate 215, a zone may be establish on only one side of the fare gate 215 (e.g., the "active" side of, or entryway into, the gateline 200).

Figure 5:
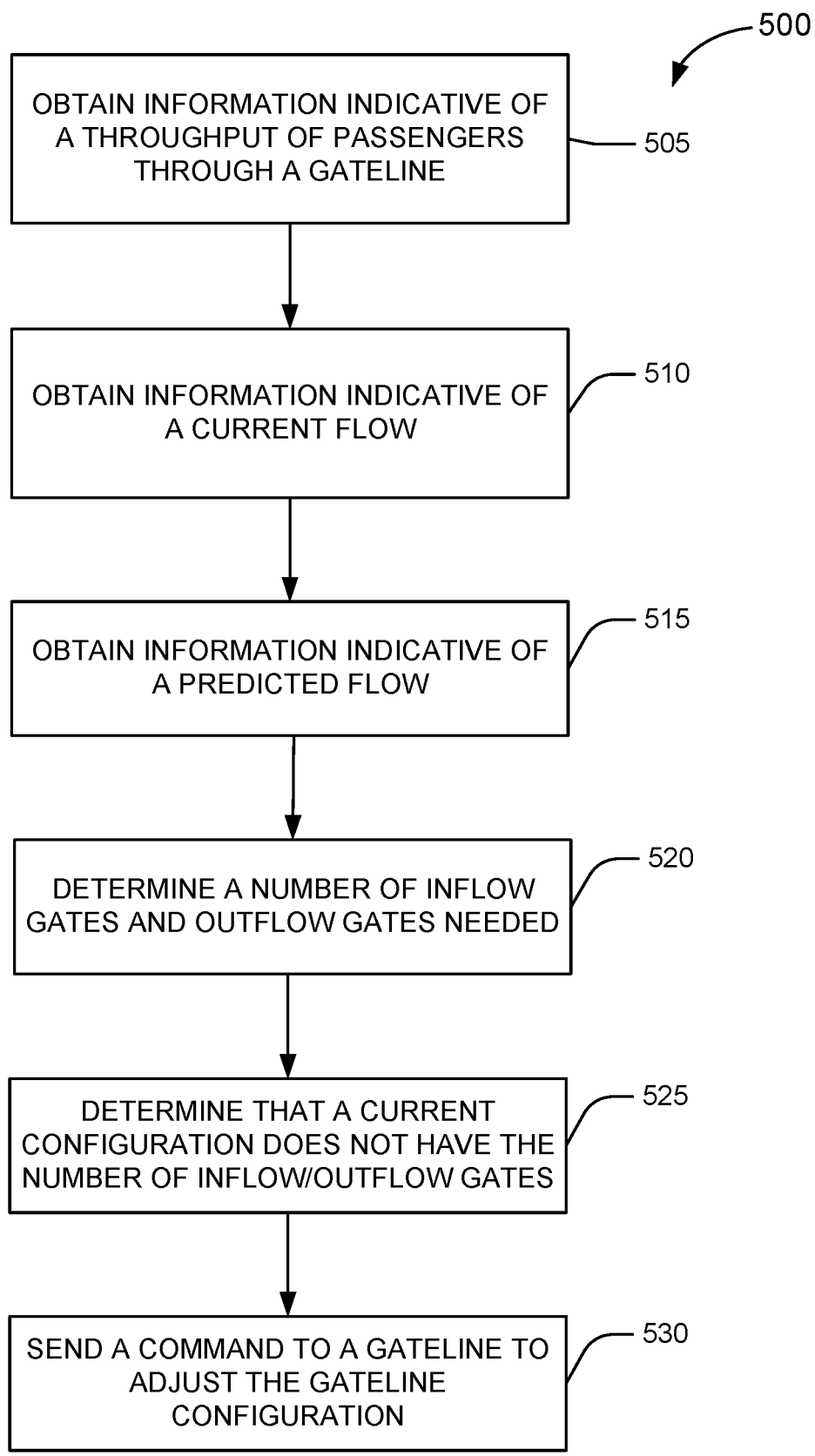
FIG. 5 is a flowchart illustrating a process for operating a gateline according to embodiments.

FIG. 5 is a flow diagram of a process 500 of configuring a gateline 200, according to an embodiment. The various blocks of the process 500 illustrated in FIG. 5 may be executed by hardware and/or software of the computer server 220, fare gates 215, sensor systems (not shown) and/or other devices/systems. Process 500 may begin at block 505 by obtaining, at a computing device, information indicative of one or both of a current or predicted amount of throughput of transit users through the gateline. Obtaining information indicative of a current flow may be achieved at block 510, for example, by retrieving polling data from one or more sensors near a gateline and/or by polling the gateline itself to determine a current amount of transit users in an area proximate the gateline, a current rate of transit users exiting and/or entering the transit station through the gateline, and/or other information related to the current state of traffic flow. This information may be usable to identify an immediate need to adjust a configuration of a gateline.

Obtaining information indicative of a predicted flow may be achieved at block 515, for example, by retrieving data from one or more data sources (such as the data sources described in relation to FIG. 1) that can provide information as to what level of transit user traffic the gateline may expect to experience based on a number of factors. For example, in some embodiments, historical information may be retrieved that indicates metrics (such as average, minimum, and/or maximum transit users in a given time period) related to past transit user traffic on a particular time, date, season, etc., previous gate configurations for different transit user volumes and/or rates and the effectiveness thereof on a particular time, date, season, etc., and/or other data about past performance of the gateline. In some embodiments, additional information, such as transit tables, disruption data, ticketing data, transit vehicle information, transit station information, weather information, event information, traffic information, and/or airport information may be retrieved for use in predicting flow of transit users.

At block 520, a determination is made as to a number of inflow gates from the gateline and a number of outflow gates from the gateline that are needed based at least in part on the information. This may be done using any combination of current and/or predictive data. For example, in some embodiments, the sensor and/or validation/passage results may be useable to determine that a current volume of users near the gateline and/or rate of user throughput at the gateline is sufficiently high and/or low on one side to warrant the gateline being configured with more entry or more exit gates. In other embodiments, the configuration may include a balanced number of entry and exit gates. In some embodiments, alternatively or in addition to the use of polling data from sensors and/or gatelines, the predictive data may be utilized to generate a desired configuration. For example, historical data may indicate what types of user flow/volume are to be expected at a particular time of day, date, etc., which may be used to determine a particular configuration. Other data sources may provide an indication of whether an increase or decrease in user volume/flow is likely over a particular timeframe, such as the next 5 minutes, 10 minutes, 30 minutes, 60 minutes, etc.

Oftentimes, the determination of a desired gateline configuration may be based on a number of factors, such as queue length threshold, average throughput rate, capacity of a transit station, passenger-based considerations, and the like. For example, the desired configuration may be based, at least in part, on trying to maintain a minimum and/or maximum user throughput rate (users per period of time, oftentimes a short period of time such as 3-5 minutes) through the gateline at all times in both directions. The configuration may be generated based on a desired to prevent a queue length and/or time from exceeding a predetermined threshold (such as 5 users in line at each gate in a particular direction). The configuration may be based on ensuring that a capacity of a station and/or platform is not exceeded. For example, if a maximum capacity is being approached, the configuration may include most of the gates being for exit out of the transit station to allow some of the crowding to subside while limiting the ability of new users to enter the station. Passenger considerations may include the desire to prioritize entry during morning rush hour periods to help people catch transit routes that are part of their morning commute, while prioritizing exits during evening rush hour periods to allow users heading home to more quickly exit the transit system. Based on any combination of the above factors (and/or others), the server may generate a desired configuration of one or more gatelines.

The gateline configurations may be balanced, entry-heavy, and/or exit-heavy to meet the needs of a particular scenario. To increase throughput in a particular direction, the configuration may include more gates shifted into operating in the particular direction. For example, if queues are forming for customers wanting to enter the transit area but not for customers exiting the transit area, a configuration may be made in which more of the gates are set for an entry mode. Typically, when heavier traffic is being experienced (which may be detected using sensor and/or gateline polling data) and/or is expected to be experienced (which may be determined based on historical data, other transit system data, and/or other external data) in a particular direction, the configuration will involve more gates operating in that direction. Conversely, if lighter traffic is being experienced and/or is expected to be experienced in a particular direction, the configuration may involve fewer gates operating in that direction.

Various embodiments may have different rules for generating the configurations. For example, some systems may wish to rely on historical data (such as long-term averages)

where possible/reliable. In such instances, historical data shows that user traffic is experienced in fairly consistent patterns, the gatelines may operate based solely (or largely) on historical data. For example, higher queue thresholds may be utilized before any deviation from historical data is used to alter a configuration of a gateline. Similarly, if historical data suggests user traffic on a particular day is more volatile, more reactive systems such as polling data and/or non-historical predictive data may be utilized to more quickly change the configuration of the gateline throughout the day. Additionally, more reactive systems may utilize shorter time averaging of user throughput that allow quicker and/or more frequent gateline configuration adaptations more possible.

At block 525, the process 500 may involve determining that a current gateline configuration does not have the number of inflow gates and the number of outflow gates. This may be done, for example, by comparing the current configuration to the configuration generated at block 520. If the configurations match, no change is needed. If the configurations do not match, the server may cause the gateline to change configuration. This may include sending a command to the gateline to adjust the current gateline configuration to have the number of inflow gates and the number of outflow gates at block 530. The command may be sent to a gateline controller and/or a controller of a particular gate. The command may cause one or more gates to switch configurations (i.e. from exit to entry or vice versa). In doing so, the command may cause any indicators of the gate's status (monitors, lights, etc.) to change states, such as by displaying a message and/or symbol that indicates the new direction of travel of the gate. Similarly, any barriers of the gate may be commanded to reverse operation such that the barriers open in an opposite direction to accommodate the changing direction of traffic flow. Additionally, fare media validation units on the previous side may be deactivated and/or set to a different mode, while fare media validation units on the input side of the new direction of flow may be activated and/or set to a new mode.

In some embodiments, the effects of any configuration changes may be measured, monitored, and/or adjusted on a single and/or continuous basis. For example, the server may desire a particular throughput rate, such as 10 people per minute. The server may monitor the throughput after the configuration change using polling data to determine whether the configuration change successfully achieve the desired throughput rate. If not, additional adjustments may be made. The throughput (real and/or expected/predicted) may be continuously monitored in some embodiments to maintain efficient gateline operation. In some embodiments, successful and/or unsuccessful gateline configurations may be saved to a database, such as a historical database, along with various conditions associated therewith. For example, if a configuration of 7 entry gates and 3 exit gates properly maintains a desired queue length and/or throughput rate after the end of a football match, the configuration may be saved for later reference if a similar scenario occurs. Similarly, if 6 entry gates and 4 exits gates were unsuccessful in the same scenario and needed to be modified, this information may be saved for later reference. In such a manner, the server may continually learn and make better determinations for adjusting gateline configurations in similar circumstances that occur in the future.

Figure 6:
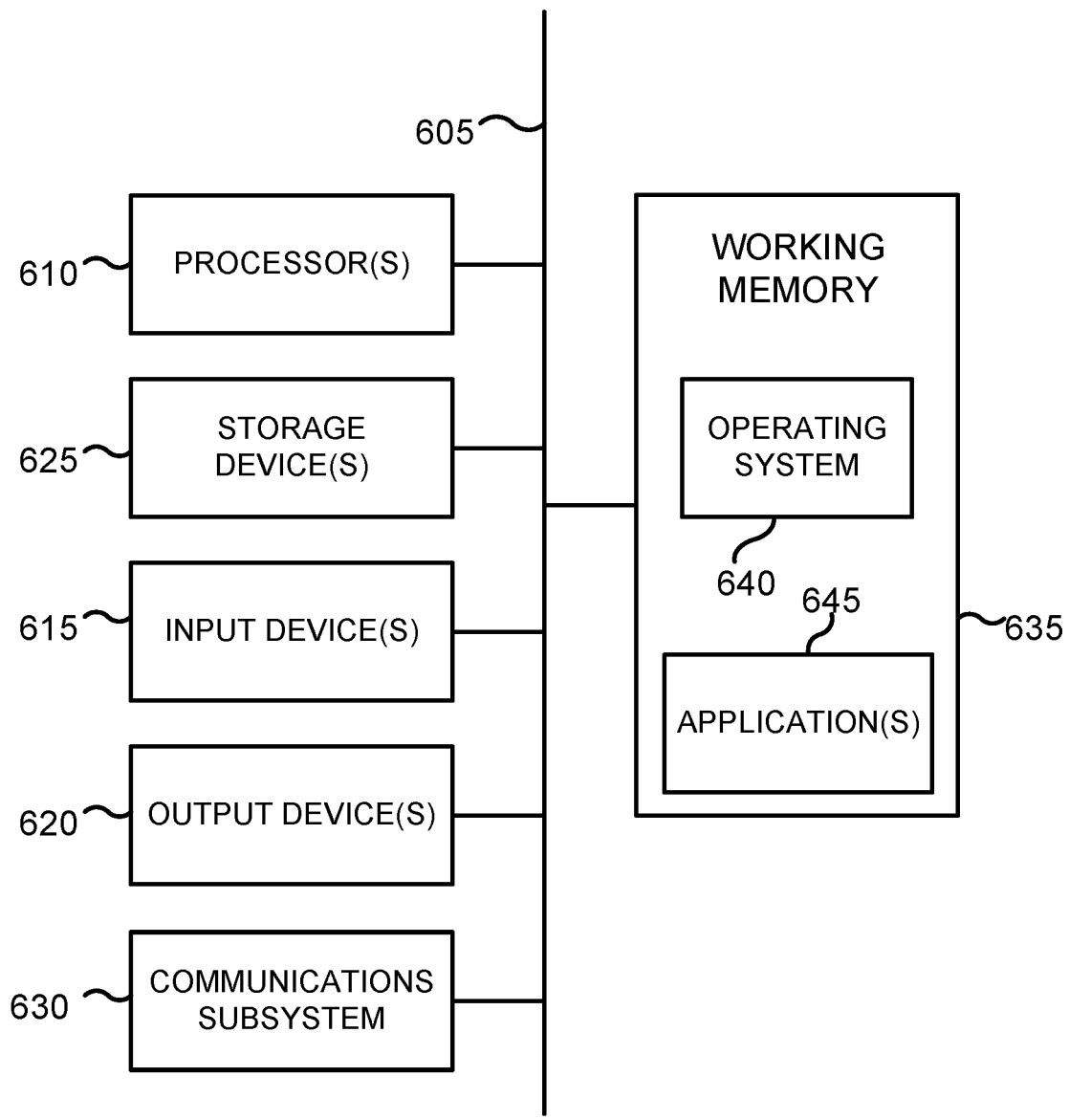
FIG. 6 is a block diagram of a computing system according to embodiments.

A computer system as illustrated in FIG. 6 may be incorporated as part of the previously described computerized devices. For example, computer system 600 can represent some of the components of computing devices, such as server 104 and/or 220, gateline 102 and/or 200, and/or other computing devices described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, a camera, a smartcard reader, a contactless media reader, and/or the like; and one or more output devices 620, which can include without limitation a display device, a speaker, a printer, a writing module, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of operating a gateline, comprising:
obtaining, at a computing device, information indicative of one or both of a current or predicted amount of throughput of transit users through the gateline;
calculating, based at least in part of the information, a desired configuration of flow direction for one or more fare gates in the gateline, wherein the desired configuration of the flow direction for the one or more fare gates comprises a number of inflow gates from the gateline and a number of outflow gates from the gateline;
comparing the desired configuration to a current gateline configuration; and
sending a command to the gateline to adjust the current gateline configuration to match the desired configuration based on a determination that the desired configuration is different than the current gateline configuration.

2. The method of operating a gateline of claim 1, wherein:
the information comprises sensor information indicative of a number of transit users within one or more zones adjacent to the one or more fare gates in the gateline.

3. The method of operating a gateline of claim 2, wherein:
the sensor information is further indicative of a velocity of at least one transit user within the one or more zones.

4. The method of operating a gateline of claim 1, wherein:
the information comprises polling information from the one or more fare gates in the gateline.

5. The method of operating a gateline of claim 4, wherein:
the polling information comprises an average throughput taken over a period of time.

6. The method of operating a gateline of claim 1, further comprising:
obtaining crowd information regarding a number of people in an area to which the gateline allows transit users to exit or enter, wherein calculating the configuration of the one or more fare gates in the gateline is further based on the crowd information.

7. The method of operating a gateline of claim 1, wherein:
the desired configuration comprises one or more of:
a determination of a direction of the throughput of transit users through the one or more gates in the gateline;
a determination of a maximum throughput of transit users through the one or more fare gates in the gateline; or
a determination of a minimum throughput of transit users through the one or more fare gates in the gateline.

8. A method of operating a gateline, comprising:
obtaining, at a computing device, information indicative of one or both of a current or predicted amount of throughput of transit users through the gateline;
determining a number of inflow gates from the gateline and a number of outflow gates from the gateline that are needed based at least in part on the information;
determining that a current gateline configuration does not have the number of inflow gates and the number of outflow gates; and
sending a command to the gateline to adjust the current gateline configuration to have the number of inflow gates and the number of outflow gates.

9. The method of operating a gateline of claim 8, wherein:
the information comprises a predicted amount of throughput of transit users, the predicted amount of throughput being based at least in part on historical gateline polling information.

10. The method of operating a gateline of claim 8, wherein:
obtaining information comprises retrieving from external database.

11. The method of operating a gateline of claim 8, further comprising:
determining that a particular timeframe is typically volatile in terms of transit user throughput, wherein determining the number of the inflow gates from the gateline and a number of the outflow gates from the gateline that are needed is based at least in part on reactive gateline metrics based on the determination that the particular timeframe is typically volatile in terms of transit user throughput.

12. The method of operating a gateline of claim 8, wherein:
the information is related to one or more of:
a current passenger level of one or more incoming transit vehicles;
an expected arrival time of one or more incoming transit vehicles;
weather data;
traffic information;
transit vehicle schedule information;
passenger ticket information; or
event information.

13. The method of operating a gateline of claim 8, wherein:
the current or predicted amount of throughput comprises one or both of inflow or outflow of transit users.

14. The method of operating a gateline of claim 8, wherein:
the information comprises a current queue length at the gateline.

15. A computing system for operating a gateline, comprising:
a communications interface;
a processor; and
a memory, the memory having instructions stored thereon that, when executed, cause the processor to:
obtain information indicative of one or both of a current or predicted amount of throughput of transit users through the gateline;
calculate, based at least in part of the information, a desired configuration of flow direction for one or more fare gates in the gateline, wherein the desired configuration of the flow direction for the one or more fare gates comprises a number of inflow gates from the gateline and a number of outflow gates from the gateline;
compare the desired configuration to a current gateline configuration; and
send, using the communications interface, a command to the gateline to adjust the current gateline configuration to match the desired configuration based on a determination that the desired configuration is different than the current gateline configuration.

16. The computing system for operating a gateline of claim 15, further comprising:
one or more sensors that are configured to detect a number of transit users within one or more zones adjacent to the one or more fare gates in the gateline, wherein the information comprises the number of transit users detected by the one or more sensors.

17. The computing system for operating a gateline of claim 16, wherein:
the one or more sensors comprise one or more of:
a stereoscopic sensor;
a depth camera;
an infrared sensor;
a closed circuit television camera;
a beacon in communication with one or more mobile devices of transit users; or
a pressure sensitive walkway.

18. The computing system for operating a gateline of claim 15, wherein:
the computing system comprises a transit station server.

19. The computing system for operating a gateline of claim 15, wherein the instructions further cause the processor to:
obtaining crowd information regarding a number of people in an area to which the gateline allows transit users to exit or enter, wherein calculating the configuration of the one or more fare gates in the gateline is further based on the crowd information.

20. The computing system for operating a gateline of claim 15, wherein:
the information comprises a predicted amount of throughput of transit users, the predicted amount of throughput being based at least in part on historical gateline polling information.

* * * * *